Sept. 16, 1941.  H. T. KRAFT ET AL  2,255,932
TIRE VALVE
Filed July 8, 1937  4 Sheets-Sheet 1
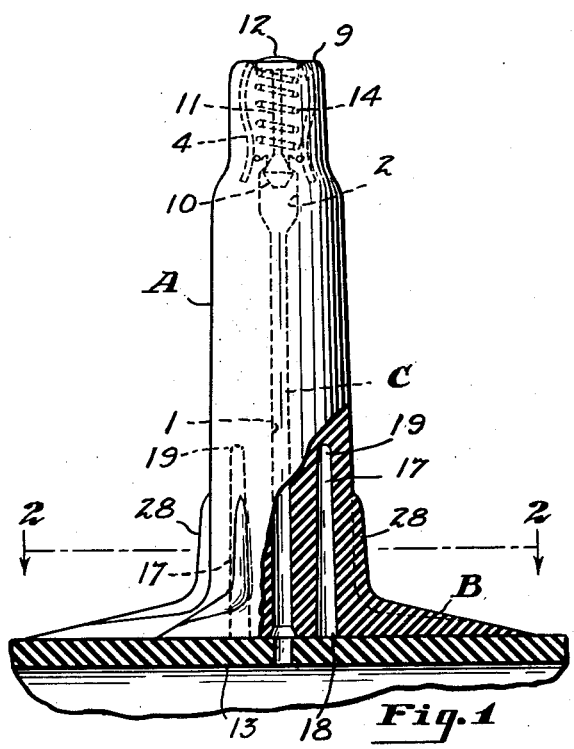
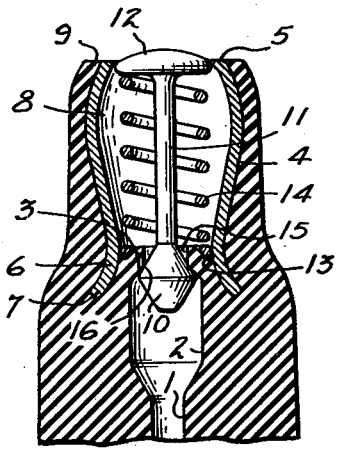
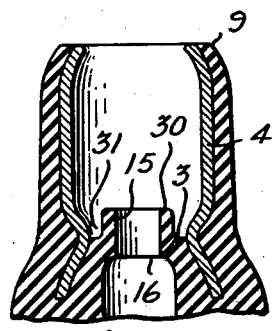
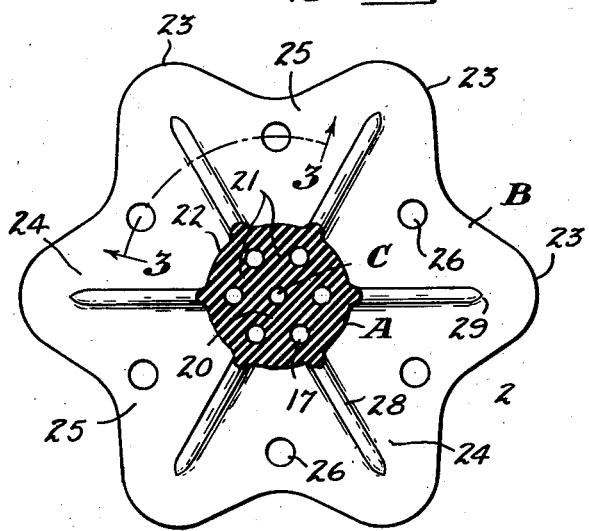
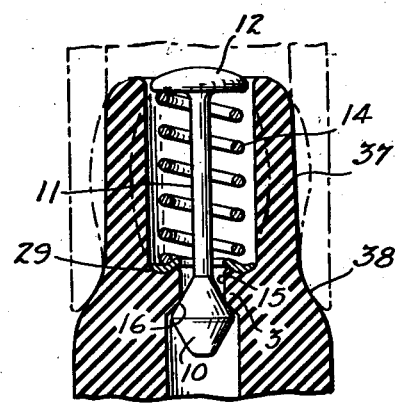
INVENTORS
*Herman T. Kraft*
*William C. McCoy*
BY *Evans + McCoy*
ATTORNEYS Sept. 16, 1941.  H. T. KRAFT ET AL  2,255,932
TIRE VALVE
Filed July 8, 1937  4 Sheets-Sheet 2

INVENTORS
Herman T. Kraft
William C. McCoy
BY Evans & McCoy
ATTORNEYS

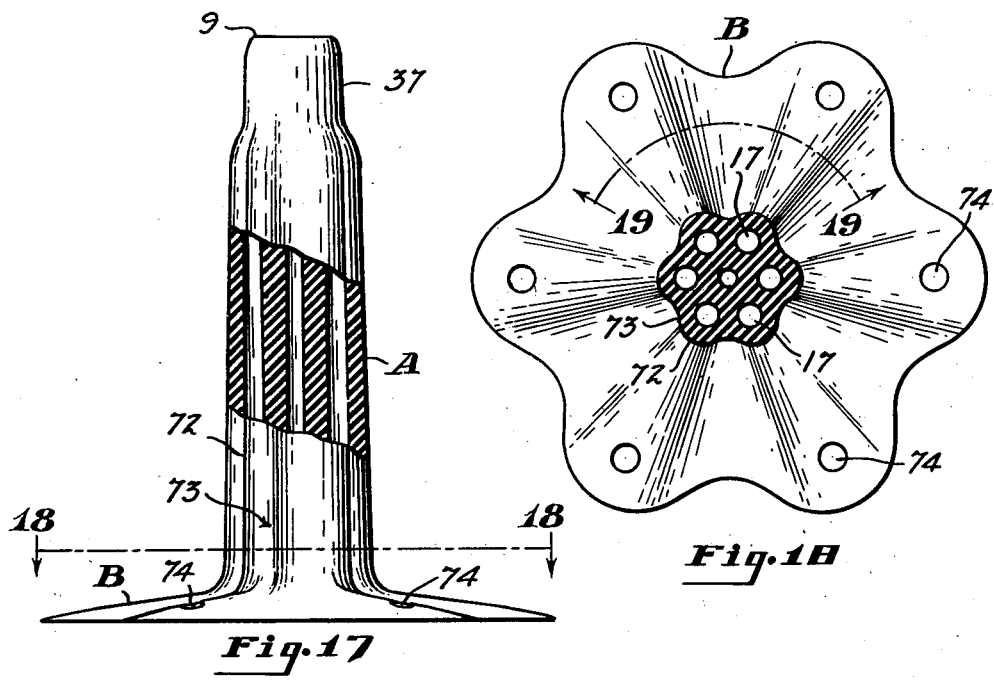
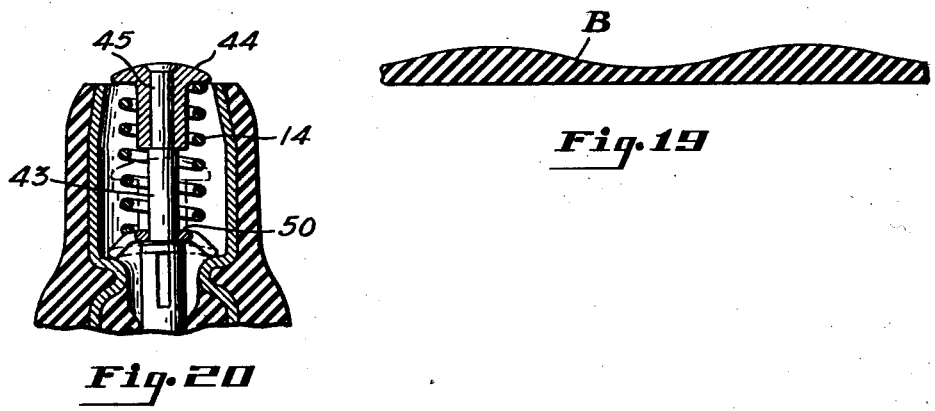

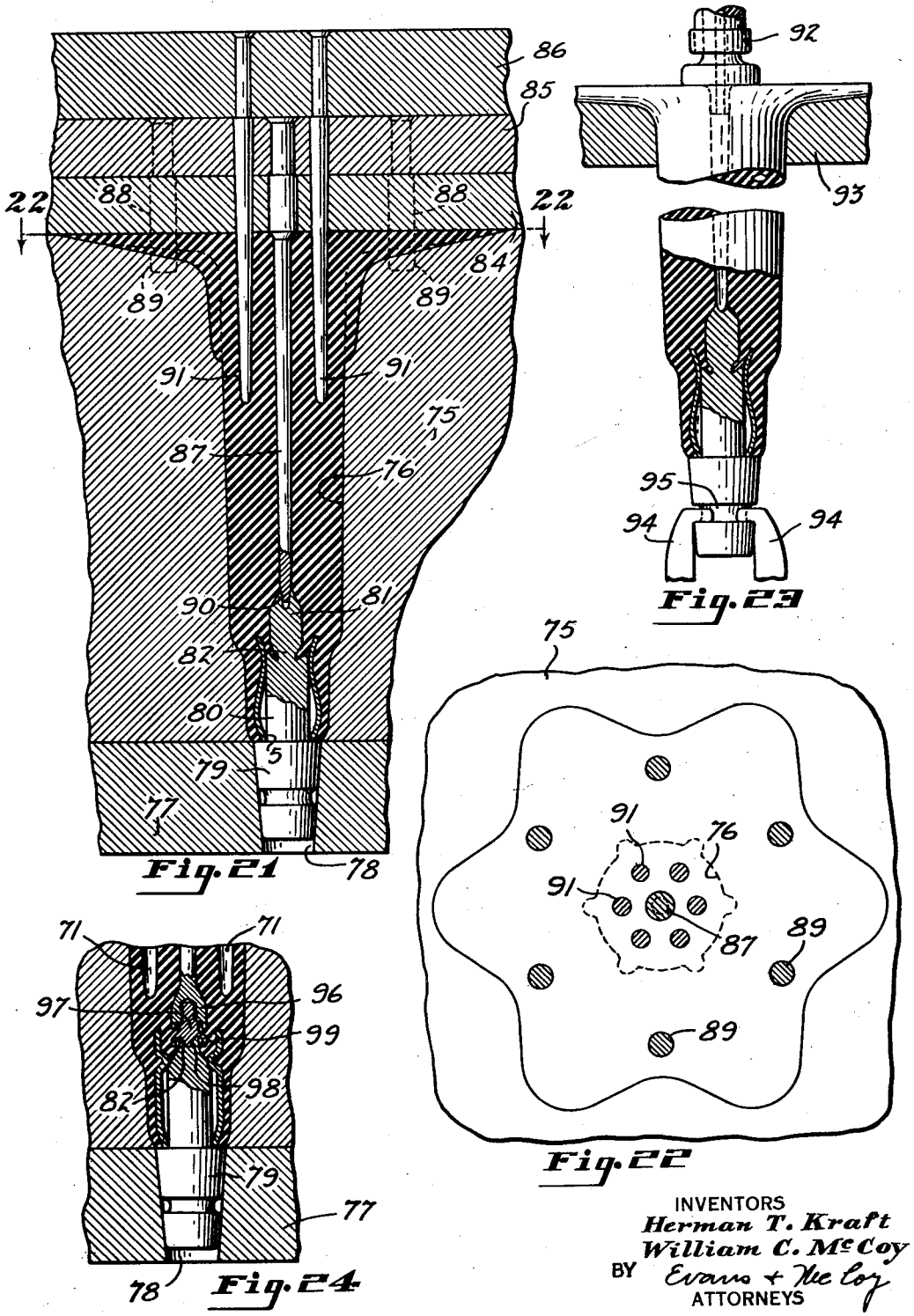

Patented Sept. 16, 1941

2,255,932

UNITED STATES PATENT OFFICE 2,255,932

TIRE VALVE

Herman T. Kraft, Akron, and William C. McCoy, Shaker Heights, Ohio, assignors, by mesne assignments, to Jenkins Bros., Bridgeport, Conn., a corporation of New Jersey Application July 8, 1937, Serial No. 152,595

20 Claims. (Cl. 152—430)

This invention relates to molded rubber valve stems of the character having flexibility throughout substantially the entire length of the body portion and in which a minimum amount of metal is used.

It is an object of the present invention to provide an improved rubber valve stem having desirable operating characteristics, which is simple in design and construction, and inexpensive to manufacture.

Valve stems constructed in accordance with the invention embody in their particular arrangement and combination of parts numerous advantages. A relatively small axial bore, preferably only sufficient for the passage of air through the valve stem, is provided so that the strength of the body portion of the stem and its resistance to ballooning or being blown out under high pneumatic pressure is considerably greater than that of former designs. The body portion of the valve stem has been designed to give it increased flexibility and lateral deformability in order that it may be easily withdrawn through the valve stem aperture in a vehicle wheel. This feature is desirable when a tire or inner tube to which the valve stem is attached moves circumferentially about its supporting wheel. The increased ease with which the present valve stem may be withdrawn through the rim of the wheel minimizes the likelihood of the valve stem being torn from the inner tube or tire so that rapid deflation is avoided and an added safety measure for vehicles is thus afforded. Also, the base or attaching portion of the valve stem is constructed so that the device may be more securely attached to the rubber of the inner tube or the vehicle tire for which it is to serve as an inflating device. The construction of the stem also affords a vent for air to escape from a tire casing through the valve stem opening in the wheel rim. Another feature is the provision of an annular valve seat of increased flexibility which accordingly readily adapts itself to the surface of the valve body to afford an effective seal of the opening or bore through the body of the valve stem and provides a rolling contact with the valve head during valve opening and closing movements.

Other objects and advantages will become apparent from the following detailed description of the invention made in connection with the accompanying drawings in which suitable embodiments are illustrated.

Figure 1 is an elevational view partly in section of one of the improved valve stems;

Fig. 2 is a section on substantially the line 2—2 of Fig. 1 showing the plan form of the base of the valve;

Fig. 3 is a fragmentary detail view in section taken substantially on the line 3—3 of Fig. 2;

Fig. 4 is an enlarged detail view in section of the tip end of the valve stem illustrated in Fig. 1;

Fig. 5 is a detail view in section with parts removed showing a modified form of construction of the tip end of a valve stem;

Fig. 6 is a fragmentary detail in section showing a modified form of construction for the tip end of a valve stem in which a tubular metallic insert is not used;

Figure 11:
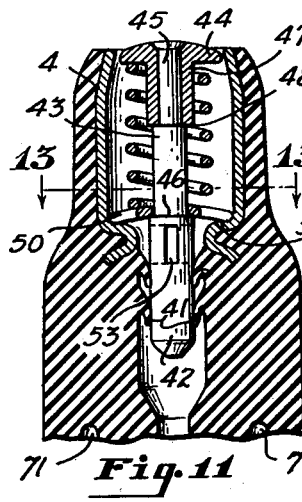
Figs. 11 and 12 are detail vertical sectional views illustrating modified valve stem tip constructions in which the valve body remains in contact with the valve seat.
Figure 12:
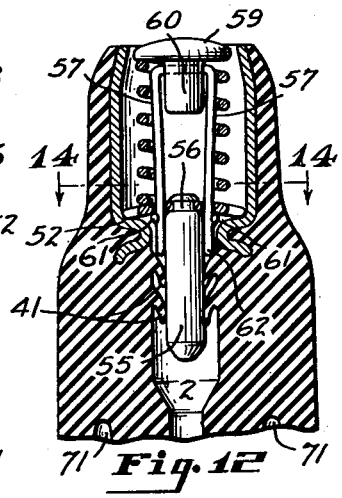
Figure 13:
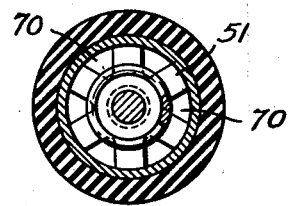
Figure 15:
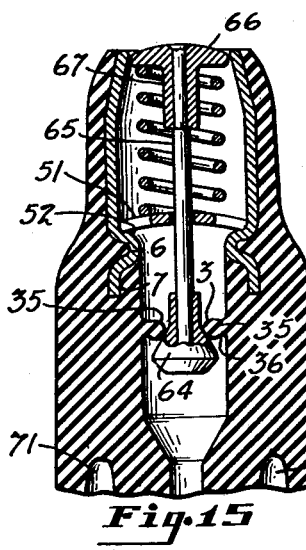
Figure 16:
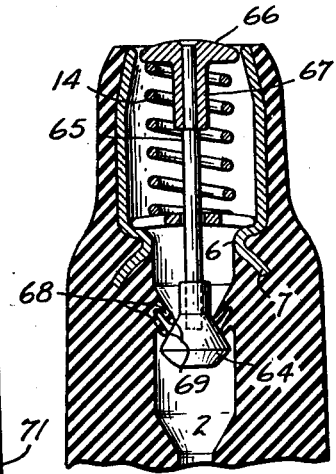
Figure 14:
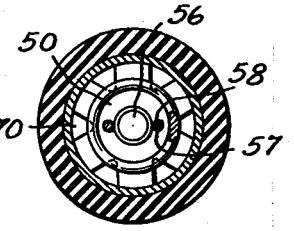

Figs. 13 and 14 are sectional views taken substantially on the lines 13—13 and 14—14 of Figs. 11 and 12, respectively;

Figs. 15 and 16 are vertical sectional detail views illustrating other modifications of valve stem tip constructions;

Fig. 17 is an elevational view partly in section and with parts removed illustrating a modified construction for the valve body and base;

Fig. 18 is a sectional view taken substantially on the line 18—18 of Fig. 17, showing the body of the stem in section and the plan of the base;

Fig. 19 is a fragmentary detail view in section taken substantially on the line 19—19 of Fig. 18;

Fig. 20 is a fragmentary detail vertical sectional view of the tip end of a valve stem illustrating the manner in which the constructions illustrated in Figs. 11, 12, 15 and 16 are assembled;

Fig. 21 is a fragmentary sectional view of a mold for vulcanizing valve stems in accordance with the present invention with a rubber valve stem shown disposed in the mold cavity;

Fig. 22 is a fragmentary view taken substantially on the line 22—22 of Fig. 21 with the rubber compound removed illustrating the plan form of the mold cavity for forming the base of a valve stem;

Fig. 23 is a fragmentary detail view partly in section and with parts broken away illustrating the manner in which a mold core is removed from the tip of a vulcanized valve stem; and Fig. 24 is a fragmentary detail view in section illustrating a modified construction of mold core for use in connection with the mold of Fig. 21.

Valve stems of the character to which this invention is directed have an elongated flexible body portion A, at one end of which is formed a radially extending flap or base B. Extending longitudinally through the stem from the base to tip 9 is an axial bore or passage C which is the conduit for air passing through the valve stem.

The bore C has a portion indicated by the numeral 1 of relatively small cross-sectional area which extends through the base of the valve stem and toward the tip end thereof. Near the tip 9 of the stem the small cross-sectional area passage portion 1 increases in diameter to form a portion of relatively large cross-sectional area indicated by the numeral 2. An annular valve seat 3 extends radially inward from the walls of the relatively large cross-sectional area passage portion 2 and is integral with the rubber valve stem body. The passage portion 2 is disposed on both sides of the valve seat 3, and the walls of the passage or bore C are composed solely of the rubber composition of the body A from the valve seat 3 to the outlet of the bore at the end of the small portion 1 in the base B.

A tubular insert 4 is disposed in the relatively large cross-sectional area portion 2 of the bore C at the tip end 9 of the valve stem. This insert or sleeve lines the bore between the valve seat 3 and the tip end 9 of the stem and is preferably formed of metal bonded to the rubber of the body A throughout substantially the entire length of the insert. Outer end 5 of the insert or sleeve is of reduced diameter or otherwise constricted. A portion of the sleeve indicated by the numeral 6 near the end thereof opposite the restricted end 5 is of reduced diameter and positioned circumferentially about the valve seat 3. The inner end of the sleeve beyond the portion 6 is flared outwardly to form a bell 7 which is embedded in the rubber of the body A and circumferentially surrounds part of the large cross-sectional area passage portion 2 adjacent the valve seat 3. Between the restricted portions 5 and 6 an enlarged valve stem tip chamber 8 is defined by the walls of the sleeve 4.

Disposed in the passage portion 2 between the valve seats 3 and the inner end of the small diameter passage portion 1 is a tapered valve body 10. This valve body has a conical surface normally held in passage sealing engagement with the valve seat 3. Extending longitudinally through the passage from the narrow end of the conical surface of the valve body 10 is a pin 11 which terminates adjacent the tip end 9 of the valve stem and has secured thereon a head 12 positioned in, and normally substantially closing, the small opening in the passage C defined by the restricted end 5 of the sleeve 4. This position of the head 12, closing the tip opening of the passage C, normally occurs when the valve body 10 is in passage-sealing engagement with the valve seat 3.

Positioned about the valve pin 11 in the valve stem tip chamber 8 is a helical compression spring 14 arranged to urge the valve body 10 toward the tip end of the valve stem with sufficient force to normally seal the opening through the valve seat 3 in the passage C.

The valve seat 3 is in the form of an annular rubber collar preferably positioned adjacent the restricted diameter portion 6 of the tubular metal sleeve 4 so that the walls of the latter reinforce the valve seat against objectionable distention. The radial walls of the valve seat are of conical form and directed toward the tip 9 of the valve stem, thus presenting a gradually increasing surface area for engagement by the valve body 10 and an annular spring seating channel 13 between the restricted portion 6 of the sleeve 4 and the conical surface of the valve seat directed toward the chamber 8. The lower end of the helical spring 14 is preferably of sufficient diameter to circumferentially contact the inner surface of the sleeve 4 adjacent the restricted portion 6. Likewise this end of the spring circumferentially contacting the side of the valve seat 3 opposite the valve body 10 cooperates with the sleeve 4 to reinforce the valve seat against excessive distention by the valve body 10. The central aperture 15 through the valve seat is of cylindrical form and of substantially uniform diameter throughout its length. In this manner is provided an initial circumferential line contact, indicated by the numeral 16, between the valve seat 3 and valve body 10. After molding the valve stem, as will be hereinafter described, it is preferable that the bore or opening 15 in the valve seat be axially aligned and trimmed by forcing therethrough, by means of a jig, a suitable implement such as a hot needle to burn off the rubber flash portions and remove irregularities in its surface.

A plurality of elongated cavities 17 of small cross section are formed in the body A of the valve stem and extend longitudinally therethrough in substantially parallel spaced relation with respect to the bore or passage C. These cavities are disposed in radial positions about the small diameter portion 1 of the passage and have openings 18 through the under side of the base B. The inner ends of the cavities 17 opposite the openings 18, terminate at 19 in a central part of the body A. The absence of solid rubber composition from the portions of the body A occupied by the cavities 17 imparts increased flexibility and resiliency thereto and lessens the resistance of the stem to lateral bending, enabling the stem to more readily adapt itself to sudden deformative forces. For example, when a vehicle tire becomes punctured so that the contained air diminishes and the tier casing moves circumferentially about the wheel, there is a corresponding dragging of the inner tube, which tends to withdraw the valve stem from the valve stem hole in the wheel to which the tire is applied. To adapt itself to such treatment the valve stem must withstand considerable distortion and abuse, while at the same time retain within the inner tube such air as remains, so that the driver of the vehicle will have an opportunity to bring it to rest before a blowout or similar disaster occurs.

A valve stem constructed in accordance with the present invention, because of the relatively small cross-sectional area of the portion 1 of the passage C, has increased resistance to ballooning or blowout, not only when the valve stem is excessively and severely deformed, but also during the manufacture of vehicle tires and inner tubes when exceedingly high pressures are applied during vulcanization. The longitudinally extending cavities 17 permit the body portion of a valve stem to be bent and twisted without objectionably injurious effects. The positioning of these cavities is such that rubber masses of excessively large section are avoided in the body portion of the stem and the relatively small section rubber masses permit increased stretching and deformation.

As shown in Fig. 1, the openings 18 of the elongated cavities 17 are sealed by the rubber of vehicle tire inner tube 13 upon application of the valve stem to the tube. The high pressure air in the inflated tube is thus prevented from entering the cavities and "ballooning" of the individual cavities is eliminated. Additionally, the avoidance of high pressures in the cavities promotes increased flexibility in the stem.

Such desirable flexibility characteristics are obtained, however, without materially diminishing the resistance of the valve stem to enlargement, or "ballooning" from the applied air pressures. This is for the reason that the cross-section of the valve stem body A is designed in accordance with the principles of a wheel structure. Referring to Fig. 2, an inner hub portion 20 surrounds the small passage portion 1 and has radiating therefrom a plurality of spoke portions 21 which terminate in a peripherally extending sheath or shell 22 adjacent the surface of the body of the stem. On the other hand, because of the number of voids or spaces afforded by the cavity 17, an enlarged tip or end carried by a mold pin in vulcanizing the valve stem may be withdrawn through the small bore portion 1 without injuring the valve stem. When this occurs the local swelling in the bore 1 caused by the passage of the enlarged mold pin head is partially absorbed by the cavities 17.

The base B of the valve stem for attaching the latter to a vehicle tire inner tube or the like taper progressively from the central portion adjacent the body A of the valve stem to the peripheral marginal edge. This edge has a plurality of scallops 23 formed thereon and each scallop is defined by a smooth curve so that the margin of the base is devoid of sharp corners and points.

Extending radially from the body A toward the tip of each of the scallops 23 is a raised or thickened portion 24. Intermediate each of the raised portions 24 is a depressed portion 25 extending from the bottom of the body A radially to the margin of the base between the scallops 23. Each of the portions 24 and 25 is tapered in cross-section from the bottom of the body portion A of the valve stem to the marginal edge of the base. Accordingly, parts of the portions 25 which are located relatively close to the center of the base may be of greater thickness than parts of the portion 24 which are adjacent the ends of the scallops 23. When referring to thin or thick portions of the base it is intended to designate portions of the base which are at substantially equal radial distances from the bore C. For example, Fig. 3 illustrates an enlarged cross-section of the base taken substantially on the arcuate line 3—3 of Fig. 2, described about the bore C as a center. This sectional view shows that the contour of the upper surface of the base B is of an undulating or rolling character, each of the high or cress portions 24 merging into the adjacent low or valley portions 25. In the valley portions 25 near the marginal edge of the base are a plurality of apertures 26. When vulcanizing a valve stem of this character to an inner tube, the rubber stock of the latter flows through the apertures 26, forming rivetlike plugs 27 (Fig. 3) which are advantageous in securing the valve stem to the tube.

The rolling surface on the top of the base B of the valve stem enables air to flow thereover between the thin portions 25 and the rim of a wheel. In this manner air entrapped within a tire casing may be vented during inflation through the valve stem hole of the wheel. Such venting action may be increased by forming a plurality of ribs 28 which extend radially over the upper surface of the base B and continuously up the surface of the body A for a short distance as shown in Fig. 1. Preferably, these ribs have the portions disposed over the base B located on the top of the thickened portions 24. Also, the portions of the ribs which extend up the outside of the body portion of the valve stem are disposed radially outward from the elongated cavities 17.

In a design of this character the relatively heavy sectioned portions of the body A forming the spoke portions 21 previously mentioned, are fastened to the relatively thin portions 25 of the base and the relatively thin sectioned portions of the body A lying radially outward of the elongated cavities 17 are secured to the thick sectioned portions 24 of the base so that increased flexibility is obtained in the structure as a whole. Instead of building up heavy sections to resist stresses and strains in the valve stem, the present invention aims to provide relatively thin sections having increased flexibility in order that the valve stem may yield to stresses to avoid breaking the attachment of the valve base to the tube, or other injury to the parts involved.

In addition to serving as an aid to vent entrapped air from a vehicle tire casing, the ribs 28 are of advantage in protecting the valve stem when the latter is withdrawn through the valve stem opening in a wheel, due to circumferential movement of the inner tube. Each of the ribs 28 is in the nature of a runner which engages the sides of the valve stem hole in the wheel and minimizes the frictional engagement between the hole and the valve stem body.

A modified form of valve body is shown in Figs. 17, 18 and 19. The elongated body A of the valve stem may have a plurality of elongated longitudinally extending ribs 72 formed on its external surface. As shown in Figs. 17 and 18 these ribs are parallel with one another and extend from the base B to or part way to the reduced diameter tip portion 37. These ribs are preferably formed with a convex outer surface and valleys 73 between the ribs formed with a concave surface so that the ribs and valleys merge into one another to form a smooth and continuous undulating surface extending circumferentially about the body A in a similar manner to the merging of the thickened portions 24 with the thin portions 25 of the base described in connection with Figs. 1, 2 and 3. Additionally, the ribs 72 at the bottom of the body A may merge into the thickened portions 24 formed radially on the base. In this arrangement there is a substantially continuous passage between the raised portions 24 and ribs 72 for the venting of air entrapped in a vehicle tire casing, permitting it to escape out the valve stem opening of the wheel rim. Each of the cavities 17 is arranged in parallel relation with one of the ribs 72 and disposed radially inward therefrom so that the relatively thick section of rubber occasioned by the formation of the ribs is relieved by the formation therein of the cavities.

The elongated cavities 17 may extend throughout substantially the entire length of the body A, terminating at 71, Figs. 11, 12, 15 and 24, adjacent the inner end of the small diameter passage portion 1. This construction is of advantage when employing a mold core having an enlarged end for forming the bore C in vulcanizing the stem. The enlarged end of the mold core is readily withdrawn through the small diameter passage 1 since the accompanying local swelling thereof is partially absorbed in the cavities 17 throughout substantially the entire length of the passage portion 1.

A number of holes 74 may be formed in the thickened portions 24 of the base B adjacent the ends of the scallops 23. During the vulcanization of a valve stem to a vehicle tire inner tube the rubber of the tube wall flows into these apertures to form plugs or rivets, which are effective in retaining the valve stem in the inner tube and in strengthening the construction against separation between the base B and the inner tube when the valve stem is being drawn through a wheel rim valve stem opening, for example, when the inner tube moves circumferentially with respect to a wheel after a puncture. Also, these plugs distribute strains imposed on the edges of the valve base.

In commercial manufacture of valve stems in accordance with the present invention, it may be desirable to incorporate in the design various modifications and structural changes. Several such alterations have been illustrated in the drawings and will now be described. In most instances the several parts bear such close resemblance to those previously described that they have been indicated by corresponding numerals of reference, and the additional identifying numerals are applied to parts which have been considerably altered or have no antecedent in the first construction described.

Figure 5 shows a modification in the construction of the valve seat 3. A cylindrical portion 30 formed on the valve seat extends longitudinally through the valve stem tip chamber 8 toward the tip end of the valve stem. The length of the bore portion 15 extending from the line contact 16 is increased and a relatively deep annular groove 31 is provided between the cylindrical portion 30 and the sleeve 4 to receive the end of the spring 14. The spring is thus prevented from misalignment with respect to the valve seat and if desired a spring of narrow diameter may be used, it being unnecessary to have the spring in circumferential contact with the sleeve 4 since the cylindrical portion 30 of the valve seat is adequate to center the spring.

Figure 7:
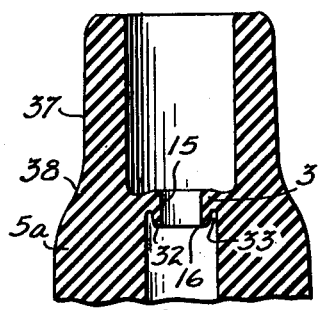
Figs. 7 and 8 are views similar to Fig. 6 with parts removed illustrating modified forms of valve seat constructions.
Figure 8:
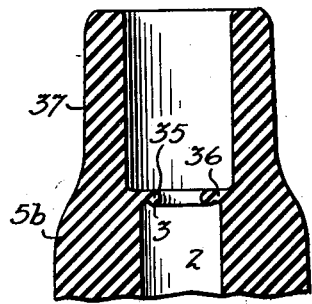

Figs. 6, 7 and 8 illustrate a valve stem tip construction in which the metallic sleeve 4 is not used, the valve body being formed of a relatively stiff rubber composition.

The valve spring 14 of the stem shown in Fig. 6 preferably seats on a cup-shaped metal washer 29 that assists in supporting the valve seat 3.

In Fig. 7 the valve seat 3 has a cylindrical portion 32 formed thereon and extending toward the base of the valve. This relatively thin sectioned cylindrical portion is of increased flexibility so that, upon engagement by the tapered valve body 10, it readily deforms and adapts itself to the contour of the valve body. When the latter is fully seated the cylindrical portion 32 may be distended and the air pressure assists in maintaining the air seal against the valve body.

The valve seat illustrated in Fig. 8 comprises a relatively thick sectioned rubber annulus 35 circumferentially joined to the walls of the large diameter portion 2 of the passage by a relatively thin sectioned circular web 36. In this modification there is no line contact like that indicated at 16 of the previous figures. The annular valve seat tends to roll on its own axis in making and breaking sealing contact with the valve body 10, thus assisting in preserving a smooth valve seat.

In inflating an article through a valve stem constructed with a tip similar to that illustrated in Figs. 6, 7 and 8, the reduced diameter portion of the body A, indicated by the numeral 37 and positioned at the tip end of the stem may be distended to bow outwardly as indicated in exaggerated form by the broken line of Fig. 6 to provide adequate air clearance between the head or cap 12 and the side walls of the tip. This enlargement of the tip may be limited to a desired degree by forming the end of the air chuck to fit over the end of the valve tip and seat against a circumferential shoulder 38 formed in the portion of the valve stem where the relatively larger diameter body portion merges into the reduced diameter portion 37.

Figure 9:
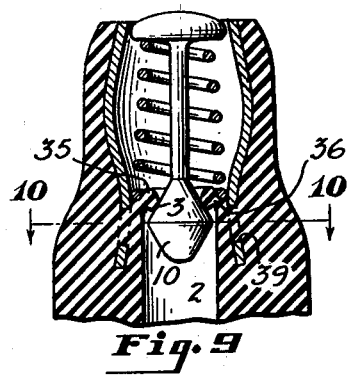
Fig. 9 is another view in section showing a modified valve stem tip construction.
Figure 10:
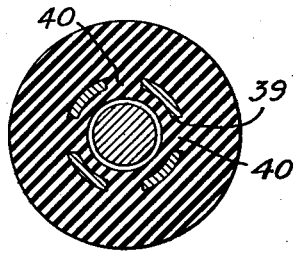
Fig. 10 is a section taken substantially on the line 10—10 of Fig. 9.

The stem tip construction illustrated in Fig. 9 employs a valve seat in the form of an annulus corresponding to that described in connection with Fig. 8 and the parts thereof have accordingly been indicated by the same numerals of reference. In this design a sleeve insert 4 is employed which has formed therein a plurality of apertures 39 adjacent the inner end. These apertures are located so that the rubber of the body A is integral from the portion on the outside of the sleeve to the inside portion thereof which lines the large diameter portion 2 of the passage. Additionally, the portion of rubber indicated by the numeral 40 of Fig. 10 which extends through each of the apertures 39 serves to anchor the insert or sleeve in the valve stem. Preferably, the location of the aperture 39 is below the position of the shoulder 38, so that the portions of rubber 40 occur in the relatively thick portion of the valve stem body.

Fig. 11 illustrates a valve in which the valve body is in the form of an elongated cylinder. Instead of a single valve seat 3, which is engaged and disengaged by the valve body 10, this design contemplates the use of a plurality of annular rubber rings 41 disposed about an elongated cylindrical valve body 42 and integral with the side walls of the large diameter portion 2 of the passage. Normally the central opening through these rings is of less diameter than the valve body 10, so that they circumferentially and elastically grip the valve body to provide an effective air seal.

The valve body 42 has a pin 43 extended longitudinally toward the tip end of the valve stem. Head 44 is carried on a reduced diameter portion of the pin 43 and is normally positioned in a restricted opening at the tip of the valve stem similarly to the position of the valve head 12 previously described in connection with Fig. 4. The valve body 42 is of greater diameter than the pin portion 43 to provide a circumferential shoulder 46. Also, the head 44 has a central annular boss portion 47 which is received on reduced diameter portion 45 of the pin 43 and is of greater diameter than the latter to provide a shoulder 48.

The pin 43 has longitudinal sliding engagement in a central aperture of a spider 50. This spider has a plurality of radially extending legs 51 which frictionally engage the inner surface of the sleeve or insert 4. The sleeve 4 is formed with an inwardly directed circumferential shoulder 52 against which the spider 50 is positioned and which serves to locate the spider during assembly of the valve. Longitudinal movement of the valve body 42 is limited by the shoulders 46 and 48 which engage the spider 50.

A plurality of inter-communicating, radially formed elongated openings 53 are formed in the valve body 42 adjacent the shoulder 46. The lower margin of these openings is normally positioned some distance toward the tip end of the valve stem from the nearest annular air sealing ring 41 and retained in such position by the spring 14 which retains the shoulder 46 seated against the spider 50. Upon depression of the valve head 44, however, the slots 53 are moved into the openings of the annular rings 41 to permit the flow of air therethrough longitudinally of the passage C and from one side of the rings to the other.

Fig. 12 illustrates a modification in the design of Fig. 11. The annular rubber rings 41 cooperate with an elongated cylindrical valve body 55 to seal the passage C. These rings are disposed in the large diameter portion 2 of the passage and integral with the body A of the valve stem. They are axially spaced inwardly in the passage C from the shoulder 52 formed circumferentially on the inner end of the sleeve insert 4. The spider 50 is retained in the valve stem tip chamber 8 at the shoulder 52 by frictional engagement of the ends of its legs 51 with the sleeve 4. A short neck 56 is formed on the end of the valve body 55 and received in the central aperture of the spider. The valve body is retained in position and secured against longitudinal movement by riveting over the end of the neck 56.

Pins 57 of a bifurcated or forked valve releasing element are disposed in substantially parallel relation with one another and longitudinally slidable in apertures 58 formed in the spider 50. The apertures 58 are disposed on opposite sides of the aperture which receives the neck 56 of the valve body 55. The cross bar connecting the pin portions 57 is positioned in an aperture through an axially extending boss 60 formed on the under side of a valve tip head 59 disposed in the restricted opening at the tip end of the valve stem. The head 59 is normally retained in the restricted opening of the bore C at the tip end of the valve stem by the compression spring 14 and enlargements or bosses 61 formed on the pins 57 prevent withdrawal of the pins through the apertures 58 of the spider 50. Upon inward movement of the valve head 59 the pins 57 move longitudinally through the enlarged passage portion 2 of the bore C in parallel relation with the valve body 55 and closely adjacent the sides thereof. Tip ends 62 of the pins, normally positioned adjacent the restricted passage through the sleeve 4 formed by the shoulder 52, move against the annular rubber sealing rings 41 and force them away from the sides of the valve body 55, thus breaking the air seal and opening passages through the valve stem. Release of the pressure on the valve head 59 permits the spring 14 to withdraw the pins 57 so that the annular rubber rings 41 again seal the passage in cooperation with the valve body 55.

Figs. 15 and 16 illustrate constructions employing the spider 50 to guide the movement of tapered valve bodies 64 and in which the valve seats are disposed axially inward a substantial distance from the restricted portions of the passage formed by the shoulder 52 on the insert 4. The tapered valve body 64 is carried on a pin 65, formed of a relatively thin and flexible material such as piano wire to which it is secured in any suitable manner such as by a press fit. The opposite end of the pin 65 is similarly secured in an axial aperture of a head 66. This aperture is formed through an axial boss 67 depending from the under side of the head. The compression spring 14 is disposed around the pin 65 between the head 66 and spider 50 to urge the tapered valve body into sealing engagement with the valve seat 3 and retain the head 66 normally positioned in the restricted opening in the tip end of the valve stem.

The valve seat illustrated in Fig. 15 is similar to that described in connection with Fig. 8 and the corresponding parts have been similarly identified. In Fig. 16 the valve seat is formed of a plurality of annular, tapered rubber rings 68. These rings are formed integral with the rubber of the body A and extend inwardly from the walls of the large-diameter portion 2 of the passage or bore C. Each ring is relatively thin and flat and individually unstable. Collectively, however, the rings are of sufficient rigidity to support the compressive force of the valve body 64 without collapse. Preferably, the rings are of frusto-conical shape and directed toward the base of the valve to present edge portions 69 substantially normal to the conical surface of the valve stem. The central axial opening through each of these rings is thus defined by a relatively sharp edge of rubber which has circumferential line contact for sealing engagement with the tapered surface of the valve body 64. From the sharp edge 69 each of the rings 68 increases progressively in thickness to the portion thereof which is formed into the side walls of the passage 2. Accordingly, this valve seat provides a plurality of independent seals for the passage and their effectiveness progressively increases as the pressure of the valve body against the rings is increased.

The manner of assembling valve stem tip constructions like those illustrated in Figs. 11 through 16 is substantially the same and the description thereof is made in connection with Fig. 20, illustrating a construction like that of Fig. 11. This same method is followed out in the assembly of valve stems constructed in accordance with the other figures with a few modifications.

In Fig. 20, the pin 43 of the valve body is inserted through the central aperture in the spider 50. The compression spring 14 is then positioned around the pin 43 and the head 44 secured on the reduced diameter portion 45 of the pin. The unit valve insides is then ready for insertion in the previously formed valve stem, and comprises the assembled valve body, pin head, spring, and the spider 50. Before being inserted in the valve stem the spider 50 is frusto-conical in shape, as seen in Fig. 20. The legs 51 are disposed at an angle with respect to the central body portion thereof and define an outer peripheral margin of the spider which is of less diameter than the restricted opening through the tip end of the sleeve 4 so that free passage of the spider therethrough in assembling the valve stem is permitted. Accordingly, the valve insides may be positioned within the insert or sleeve 4, as indicated by the full lines of Fig. 20. The head 44 is then forced downwardly, so that the end of the boss 47 engages the central body portion of the spider adjacent the central opening which receives the pin 43 of the valve body. The legs 51, which have their ends seated on the shoulder 52 of the sleeve, are then bent upward by pressure of the boss 47 against the body portion of the spider 50 so that the latter assumes the substantially flat position indicated by the broken lines of Fig. 20 and as shown in Figs. 11, 12, 15 and 16. The axial length of the boss 47 is sufficient so that when it is in engagement with the spider 50 the spring 14 is not compressed to its minimum length and there is no direct pressure other than the resilient pressure of the spring exerted on the spider by the spring 14. In this operation of flattening the spider 50 the ends of the legs 51 in effect move radially outward to an increased peripheral diameter so that their peripheral ends engage the side walls of the sleeve 4 adjacent the shoulder 52. Preferably the spider is made of a relatively hard and noncorrosive material such as steel alloy, while the sleeve is made of a relatively soft material such as brass or copper so that the ends of the legs 51 may bite into the sleeve to secure the spider and unit valve insides in position. Between the legs 51 are notches 70 which serve as passageways for the flow of air through the valve stem.

The valve stems such as those illustrated in the drawings and described above which embody the present invention readily lend themselves to manufacture by a rubber molding process. Such process may conform generally to the standard practice followed in the fabrication of molded articles out of rubber compounds and the like. Particular modifications to adapt such a process to the manufacture of the present type of article are diagrammatically illustrated in Figs. 21 through 24. The first three of these figures illustrate the manufacture of a valve stem such as that described in connection with Figs. 1 through 4.

A mold cavity corresponding to the outer peripheral contour of the valve stem is formed in a mold section 75. This mold cavity is indicated by the numeral 76 and a bottom mold plate 77 has a tapered aperture 78 in axial alinement therewith. This aperture receives a core piece 79 which has a cylindrical portion 80 extending axially into the mold cavity 76 and is surmounted by an enlarged elongated knob 81 secured to the cylindrical portion by a relatively small diameter neck 82. There is thus formed between a cylindrical portion 80 of the mold piece and the knob 81 an annular groove which corresponds in shape to the valve seat 3 to be formed in the passage C of the valve stem.

A sleeve 4 is received on the cylindrical portion 80 and has its outer or tip end 5 abutting against an annular cavity sealing shoulder of the mold piece 79 which is positioned at the extreme end of the mold cavity 76. The restricted or reduced diameter portion 6 of the sleeve is in circumferential engagement with the end of the cylindrical portion 80 of the mold piece adjacent the annular groove formed around the neck 82. In this manner the interior portion of the sleeve which forms the valve stem tip chamber 8 is sealed off from the remainder of the mold cavity so that during the molding operation the rubber compound is not forced into it.

A top mold plate 84 defines the portion of the mold cavity which forms the bottom surface of the valve stem base and resting thereon is a core mold member 85 and a pin mold member 86. The core mold member carries a core pin 87 which forms the passage C of the valve stem and a plurality of core plugs 88 which form the apertures 26 in the base B. Suitable apertures or holes are formed in the top mold plate 84 to receive and guide these cores and plugs so that they may be retracted therethrough at the completion of a molding operation. A number of sockets 89 are formed in the mold sections 75 to receive the ends of the plugs 88 in centering the latter for molding and to insure a clean aperture through the finished valve stem base. These apertures 26 also may be formed by punching holes in the completed valve base.

The extreme end of the core 87 is formed with a point 90 which is received in a socket formed in the end of the knob 81. This construction enables the core 87 to center itself during the molding operation and insures that the passage C is continuous through the completed valve stem. The pin mold member 86 has secured therein a plurality of mold pins 91 which form the elongated cavities 17 in the stem and pass through suitably formed passages in the top mold plate 84 and core mold member 85.

In molding a valve stem with this equipment a sleeve 4 is placed on the cylindrical portion 80 of the mold piece 79 and the latter is seated in the tapered aperture 78 of the bottom mold plate 77 which is then placed against the mold section 75 so that the mold piece 79 is centered in the mold cavity 76. The top mold plate 84 is then placed over the core pin 87 and plugs 88. A plug of rubber compound sufficient in quantity to form the valve stem is placed around the core pin 87 and the latter, together with the rubber compound, is inserted into the mold cavity 76, care being taken to center the point 90 of the core pin so that it seats in the socket formed in the end of the knob 81. The mold pins 91 are then inserted through the passages in core mold member 85 and the top mold plate 84 and into the mold cavity so that they serve to assist in forcing the raw rubber compound into all portions of the mold cavity. The vulcanization process is then carried out in the usual manner after which the mold pins 91, core pin 87 and plugs 88 are stripped or withdrawn from the molded article.

The mold piece 79 is released from the tapered cavity 78 so that it may be withdrawn through the mold cavity 76 when the valve stem is stripped therefrom. This is for the reason that it is preferable to apply air pressure to the passage C before withdrawing the knob 81 from the valve stem passage. In withdrawing the knob 81 from the valve stem it is clear that considerable distortion of the annular rubber valve seat 3 must occur. This withdrawal may be accomplished as illustrated in Fig. 23 in which an air chuck 92 is applied to the bottom of the reduced diameter portion 1 of the passage C and the valve stem held in seating engagement therewith by an apertured jig 93 which engages the top surface of the base B. Air pressure is then applied to the chuck and the knob 81 withdrawn by grasping the mold piece 79 with pincers 94 which engage an annular groove 95 formed therein.

To form a valve stem similar to that illustrated in Fig. 11 the mold construction is slightly modified as indicated in Fig. 24. The tip end of the core pin 87 is enlarged or flared at 96 to form the enlarged diameter portion 2 of the passage C instead of having this portion of the passage formed by the knob 81. This enlargement 96 has an internally threaded axial socket which receives a mold pin tip element 97. This mold tip element has an axially extending pin 98 which engages a socket in the end of the reduced diameter neck portion 82 formed on the end of cylindrical portion 80 of the mold piece 79. Both the enlarged portion 96 of the core pin 87 and the pin tip element 97 are formed thereon annular ring shaped flanges 99 which cooperate with one another and the neck 82 of the mold piece 79, to define the cavities for forming the annular rubber rings 41. The molding of a valve stem using this modified form of core pin 87 is similar to that previously described, but the withdrawal of the core pin 87 must be attended with caution to avoid injuring the annular rubber rings 41. Preferably, the mold piece 79 is first removed, which thus releases the annular rubber ring 41 nearest the top of the valve stem. During the withdrawal of the core pin 87 the enlarged portion 96 and the pin tip element 97 must be withdrawn through the relatively small diameter portion 1 of the passage C. On account of the elongated cavities 17 which are formed by the previously withdrawn mold pins 91 the side walls of the passage portion 1 are readily distended by the enlarged portion 96 of the core pin 87 which is thus withdrawn without injury to the valve stem. When the valve stem construction is such that an enlarged part of the core, such for example, as the knob 96, is to be withdrawn through the small diameter portion 1 of the bore C, it is preferable to extend the elongated cavities through the body A to adjacent the valve seat 3. This is accomplished by the use of longer mold pins 91.

In assembling valve stems such as that illustrated in Figs. 1 through 4, the helical compression spring 14 is placed about the pin 11 by passing the valve body 10 longitudinally through the spring. The greatest diameter of the valve body 10 is substantially less than the diameter of the head 12 so that the helical spring 14 may be passed over the valve body and seat against the head 12. The valve seat 3 and valve body 10 are lubricated with soap solution or water so that the latter may be forced through the central bore or opening 15 into the part of the enlarged passage portion 2 which is between the small diameter bore portion 1 and the valve seat 3. Air pressure applied to the base end of the air passage will facilitate entry of the valve head. The thickness of the valve seat 3 gives it sufficient rigidity to prevent withdrawal of the valve body 10 through the passage 15 under normal operating conditions. The valve spring 14 may be collapsed during assembly by using a flat wire hook that is removed after the valve is assembled.

Valve stems of the character described above are all characterized by the feature of assembling the valve body and the valve stem by inserting it through the tip end thereof. This is of considerable advantage since in various applications of valve stems it is desirable that the base and body thereof may be vulcanized to the article before the valve body is applied. Valve stems which must have the valve body inserted through the base thereof do not permit such use and require that the valve stem be completely assembled before vulcanizing it to an article. Features disclosed but not claimed herein form subject matter of co-pending applications of William C. McCoy, Serial No. 152,594, filed July 8, 1937; Serial No. 167,721, filed September 14, 1937; and Serial No. 271,840, filed May 5, 1939.

The embodiments of this invention shown in the drawings are given for purposes of illustration and description and it is contemplated that various modifications and alterations thereof and changes in the methods of manufacture and assembly will be made and are intended to be included within the scope of the appended claims.

What we claim is:

1. A molded rubber valve stem comprising an elongated body portion having a radially flared base integral therewith for attaching the valve stem to an article to be inflated therethrough, a relatively small diameter axial bore extending through the body and base for the passage of air, and a plurality of elongated cavities individually of greater cross sectional area than the bore formed in the body portion and extending in substantially parallel relation with the bore.

2. A molded rubber valve stem comprising an elongated body portion having a radially flared base integral therewith for attaching the valve stem to an article to be inflated therethrough, a relatively small diameter axial bore extending through the body and base for the passage of air, and a plurality of elongated cavities formed in the body portion and extending in substantially parallel relation with the bore, said cavities being individually of greater cross-sectional area than the bore and continuous through the base and body and having a tapering cross section with the greatest cross sectional area adjacent the base.

3. A molded rubber valve stem comprising an elongated body portion with a central axial bore for the passage of air and a radially flared base integral with the body for attaching the valve stem to an article to be inflated therethrough, said base having a plurality of relatively thick radially extending portions alternating with a plurality of relatively thin radially extending portions.

4. A molded rubber valve stem comprising an elongated body portion with a central axial bore for the passage of air and a radially flared base integral with the body for attaching the valve stem to an article to be inflated therethrough, said base having a plurality of relatively thick radially extending portions alternating with a plurality of relatively thin radially extending portions and a plurality of scallops formed on the marginal edge of the base.

5. A molded rubber valve stem comprising an elongated body portion with a central axial bore for the passage of air and a radially flared base integral with the body for attaching the valve stem to an article to be inflated therethrough, said base having a plurality of relatively thick portions alternating with a plurality of relatively thin portions, and a plurality of apertures formed to extend through the base to receive rubber plugs of the article to which the stem is applied.

6. A molded rubber valve stem comprising an elongated body portion with a central axial bore for the passage of air and a radially flared base integral with the body for attaching the valve stem to an article to be inflated therethrough, said body having a plurality of longitudinally extending ribs formed thereon and the ribs extending substantially continuously from substantially end to end of the valve stem body.

7. A molded rubber valve stem comprising an elongated body portion having a radially flared base integral therewith for attaching the valve stem to an article to be inflated therethrough, a bore extending through the body and base for the passage of air, a plurality of elongated cavities formed in the body portion and extending in substantially parallel relation with the bore, a plurality of ribs formed on the body and extending longitudinally thereof, and the ribs disposed radially outward of the elongated cavities and parallel therewith whereby the valleys between the ribs diminish the section of rubber between adjacent cavities.

8. A rubber valve stem comprising an elongated body, a radially extending base having alternate radially disposed thick and thin portions, and ribs on the body and said thick portions of the base.

9. A valve stem comprising a rubber body having an integral radially extending base and a tip end portion of reduced cross sectional area, an air passage through the body and the base, and ribs extending longitudinally of the body and radially on the base therefrom, said ribs being continuous on the body substantially from the reduced area tip end to the base.

10. A rubber valve stem comprising an elongated body, a radially extending base having alternate radially disposed thick and thin portions, and scallops on the periphery of the base, said scallops each being at the end of one of the thick portions.

11. A rubber valve stem comprising an elongated body, a radially extending base having alternate radially disposed thick and thin portions, scallops on the periphery of the base, said scallops each being at the end of one of the thick portions, and ribs on the body and said thick portions of the base, said ribs extending in the direction of the scallops.

12. A rubber valve stem comprising an elongated body, a radially extending base having alternate radially disposed thick and thin portions, and apertures through the thick portions of the base to receive attaching plugs.

13. A rubber valve stem comprising an elongated body portion of fluted character having a longitudinally extending air passage and a radially extending base, said base having raised portions which are integral with and extend as continuations of the portions of the body between the flutes, and a plurality of elongated cavities in the body disposed in approximately parallel relation to one another, said cavities each having a cross sectional area generally greater than that of the air passage.

14. A valve stem comprising an elongated rubber body having an air passage extending longitudinally therethrough, said passage having a rubber walled portion of relatively small cross sectional area and a portion of relatively large cross sectional area, and a plurality of elongated cavities in the part of the body having the small area portion of the passage, said cavities each having a cross sectional area generally larger than that of the small area passage portion.

15. A valve stem comprising an elongated rubber body having an air passage extending longitudinally therethrough, said passage having a rubber walled portion of relatively small cross sectional area and a portion of relatively large cross sectional area, and a plurality of elongated cavities in the part of the body having the small area portion of the passage, said cavities extending from one end of the body to adjacent the large area passage portion and each having a cross sectional area generally larger than that of the small area passage portion.

16. A valve stem formed of resilient deformable material and comprising an elongated body of fluted character having concave and convex curved surface portions alternating with one another and extending longitudinally thereof, said surface portions being merged into one another to provide a substantially continuous, circumferentially extending undulating surface, and a radially extending attaching flap integral with the body.

17. A valve stem formed of resilient deformable material and comprising an elongated body of fluted character providing longitudinally extending ribs thereon, a radially extending base integral with the body and formed with alternate thick and thin portions, and scallops on the periphery of the base, the thick base portions being radially aligned with the body ribs and the scallops being radially aligned with the thick base portions.

18. A valve stem of rubber or the like comprising an elongated body having a radially extending base and an axial air passage, means providing elongated cavities grouped about the passage and extending in generally parallel relation to one another longitudinally through the body, and raised portions on the body and base providing ribs, said ribs being radially aligned with the cavities and each rib being continuous over the base and the body.

19. In combination, a rubber valve stem comprising a base and an elongated body having an air passage extending longitudinally therethrough, the passage walls being defined by the rubber of the stem and including a zone of relatively large cross sectional area and a zone of relatively small cross sectional area extending to the base, valve means for closing said passage, a plurality of elongated cavities in the body and grouped about the small area zone of the passage, said cavities being spaced from one another and extended through the base, and means closing the ends of the cavities at the base end of the stem.

20. In combination, a rubber valve stem comprising a base and an elongated body having an air passage extending longitudinally therethrough, the passage walls being defined by the rubber of the stem, valve means for closing said passage, a plurality of elongated cavities in the body and grouped about the passage, said cavities being spaced from one another by the rubber of the stem and extended through the base, and means closing the ends of the cavities at the base end of the stem.

HERMAN T. KRAFT.
WILLIAM C. McCOY.